(12) United States Patent
Potter et al.

(10) Patent No.: US 7,486,042 B2
(45) Date of Patent: Feb. 3, 2009

(54) COMPONENT POSITION DETERMINATION CIRCUIT USING A BRUSHLESS DC MOTOR COMMUTATION SENSOR

(75) Inventors: Calvin C. Potter, Mesa, AZ (US); Casey Hanlon, Queen Creek, AZ (US); Paul T. Wingett, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/481,356

(22) Filed: Jul. 5, 2006

(65) Prior Publication Data

US 2008/0018282 A1 Jan. 24, 2008

(51) Int. Cl.
 *H02P 7/00* (2006.01)
(52) U.S. Cl. .................... 318/466; 318/254.1; 318/467; 388/901
(58) Field of Classification Search ................. 318/254, 318/456, 466, 467; 388/901
 See application file for complete search history.

(56) References Cited

U.S. PATENT DOCUMENTS

| | | | |
|---|---|---|---|
| 3,512,060 A | 5/1970 | Floyd | |
| 3,633,412 A | 1/1972 | Pelta | |
| 3,714,434 A | 1/1973 | Mears, Jr. et al. | |
| 4,006,394 A | 2/1977 | Cuda et al. | |
| 4,338,552 A | 7/1982 | Pilz et al. | |
| 4,437,047 A | 3/1984 | Smay | |
| 4,696,568 A | 9/1987 | Weistra | |
| 4,751,441 A * | 6/1988 | Lewis | 318/400.09 |
| 5,254,919 A | 10/1993 | Bridges et al. | |
| 5,341,209 A | 8/1994 | Karpinski | |
| 5,345,156 A * | 9/1994 | Moreira | 318/400.04 |
| 5,684,374 A | 11/1997 | Chaffee | |
| 5,739,650 A * | 4/1998 | Kimura et al. | 318/400.07 |
| 5,870,248 A * | 2/1999 | Akutsu et al. | 360/99.04 |
| 5,982,124 A * | 11/1999 | Wang | 318/466 |
| 6,466,890 B1 * | 10/2002 | Shiba et al. | 702/150 |
| 6,545,438 B1 * | 4/2003 | Mays, II | 318/400.01 |
| 6,586,898 B2 * | 7/2003 | King et al. | 318/400.34 |
| 6,611,117 B1 * | 8/2003 | Hardt | 318/400.22 |
| 6,681,196 B2 | 1/2004 | Glaser et al. | |
| 6,922,030 B2 * | 7/2005 | Chou | 318/400.22 |

* cited by examiner

*Primary Examiner*—Bentsu Ro
*Assistant Examiner*—Thai Dinh
(74) *Attorney, Agent, or Firm*—Ingrassia Fisher & Lorenz, P.C.

(57) ABSTRACT

A position determination circuit uses the commutation sensor of a brushless DC motor to determine the position of an actuator and/or actuated component 125. The commutation sensor supplies a rotational position signal representative of the rotational position of the motor to a pulse generator. The pulse generator generates a pulse each time the rotational position signal represents a complete revolution of the brushless DC motor. The generated pulses are supplied to an integrator circuit, which selectively supplies a position signal having a voltage magnitude representative of the position of the actuator and/or component.

20 Claims, 2 Drawing Sheets

COMPONENT POSITION DETERMINATION CIRCUIT USING A BRUSHLESS DC MOTOR COMMUTATION SENSOR

TECHNICAL FIELD

The present invention relates to a component position determination circuit and, more particularly, to a position determination circuit that uses the commutation sensor of a brushless DC motor to determine, and supply a position signal representative of, a component position.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. In many applications, the actuators include power drive units, such as a motor, that are configured to receive a source of drive power to move an actuator element, and thus the control surfaces or components, to a commanded position.

When the power drive unit is implemented as a brushless DC motor, a motor rotational position sensor is typically included and is used to properly control motor commutation. Moreover, a second position sensor may additionally be provided to supply a position feedback signal representative of the actual component position. This position sensor may be associated with either the component itself or with the actuator. In many instances the position sensor is associated with the actuator, and may be implemented as an LVDT (linear variable differential transformer) or RVDT (rotary variable differential transformer).

Although the above-described configuration is generally safe, reliable, and robust, it can suffer certain drawbacks. For example, the second position sensor may be relatively expensive and thus cost prohibitive to system implementation, most notably if an LVDT or RVDT is used. However, component position can be a desirable parameter to determine in order to implement accurate closed-loop position control and to provide accurate position indication of the component. Hence, there is a need for determining the position of an actuator, or an actuated component 125, without incurring the potentially prohibitive cost that may be associated with providing a dedicated sensor for this function. The present invention addresses at least this need.

BRIEF SUMMARY

The present invention provides a circuit for determining the position of an actuator, or an actuated component 125, without incurring the potentially prohibitive cost that may be associated with providing a dedicated sensor for this function. In one embodiment, and by way of example only, a position determination circuit for determining a position of a component driven by a brushless DC motor includes a commutation sensor, a pulse generator, and an integrator circuit. The commutation sensor is configured to sense a rotational position of the brushless DC motor and is operable to supply a rotational position signal representative thereof. The pulse generator is coupled to receive the rotational position signal and is operable to generate a pulse each time the rotational position signal represents a complete revolution of the brushless DC motor. The integrator circuit is coupled to receive an enable signal and each pulse generated by the pulse generator. The integrator circuit is operable, upon receipt of both the enable signal and each pulse, to selectively supply a position signal having a voltage magnitude representative of the position of the component.

In another exemplary embodiment, an actuation control system includes a motor control circuit, a brushless DC motor, an actuator, a commutation sensor, a pulse generator, and an integrator circuit. The motor control circuit is configured to receive position command signals and is operable, upon receipt thereof, to supply DC excitation signals. The brushless DC motor is coupled to receive the DC excitation signals and is operable, upon receipt thereof, to rotate and supply a drive force. The actuator is coupled to receive the drive force and is operable, upon receipt thereof, to move to an actuator position. The commutation sensor is configured to sense rotational position of the brushless DC motor and is operable to supply a rotational position signal representative thereof. The pulse generator is coupled to receive the rotational position signal and is operable to generate a pulse each time the rotational position signal represents a complete revolution of the brushless DC motor. The integrator circuit is coupled to receive an enable signal and each pulse generated by the pulse generator. The integrator circuit is operable, upon receipt of both the enable signal and each pulse, to selectively supply a position signal having a voltage magnitude representative of the actuator position.

In yet another exemplary embodiment, a position determination circuit for determining a position of a component driven by a brushless DC motor includes a commutation sensor, a processor, and an integration circuit. The commutation sensor is configured to sense a rotational position of the brushless DC motor and is operable to supply a rotational position signal representative thereof. The processor includes a counter and a pulse generator, and is coupled to receive the rotational position signal and is operable, upon receipt thereof, to command the counter to count a number of complete revolutions of the brushless DC motor, and command the pulse generator to generate a pulse each time the brushless DC motor makes a complete revolution. The integrator circuit is coupled to receive each pulse generated by the pulse generator and is operable, upon receipt thereof, to supply an analog position signal having a voltage magnitude representative of the position of the component.

Other independent features and advantages of the preferred position determination circuit will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description. In this regard, before proceeding with the detailed description, it is to be appreciated that the described embodiment is not limited to use in conjunction with a specific vehicle or system. Thus, although the description is explicitly directed toward an embodiment that is implemented with a linear-type actuator, it will be appreciated that it could also be implemented in any one of numerous other types of actuators.

Figure 1:
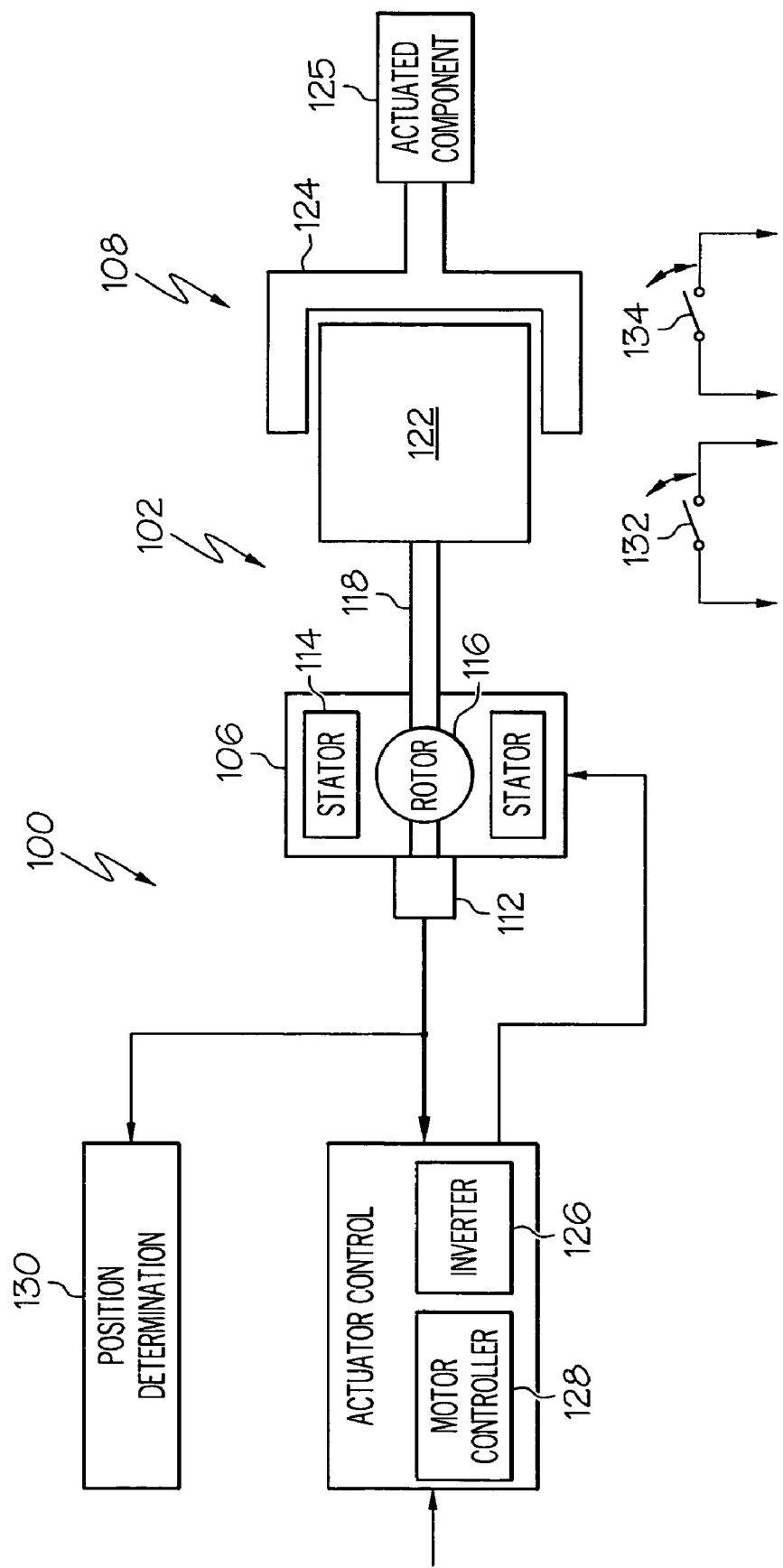
FIG. 1 is a functional block diagram of an exemplary actuator control system.

Turning now to FIG. 1, a functional block diagram of an exemplary actuator control system 100 is shown. The system 100, which may be used to control the movement of any one of numerous components, includes an actuator assembly 102 and an actuator control circuit 104. The actuator assembly 102 includes a brushless DC motor 106, an actuator 108, and a commutation sensor 112. The motor 106 includes a stator 114, a rotor 116, and an output shaft 118. It will be appreciated that the motor 106 is preferably implemented as a three-phase brushless DC motor, and is configured, upon being properly energized, to rotate and thereby supply a rotational drive force via the motor output shaft 118.

As FIG. 1 also shows, the motor output shaft 118 is coupled to the actuator 108. In the depicted embodiment, the actuator 108 includes an actuation member 122, which is coupled to receive the rotational drive force from the motor output shaft 118, and a translation member 124. In response to the rotational drive force supplied from the motor output shaft 118, the actuation member 122 rotates. The translation member 124 is coupled to the actuation member 122 and an actuated component 125 is configured, upon rotation thereof, to translate to a position, and thereby move the actuated component 125. It will be appreciated that the actuation member 122 and translation member 124 could be implemented as any one of numerous assemblies that convert rotational motion into translational motion including, for example, ballscrew assemblies, jackscrew assemblies, and rollerscrew assemblies, just to name a few. It will additionally be appreciated that the actuator 108 could be implemented as any one of numerous other types of actuators including, but not limited to, numerous other types of linear actuators and/or numerous types of rotary actuators, just to name a few. Moreover, it will be further appreciated that the actuated component 125, upon being actuated by the actuator 108, could be configured to either translate or rotate.

The actuator control circuit 104 is configured to receive external control signals from one or more external sources (not shown in FIG. 1). In response to these control signals, the actuator control circuit 104 appropriately energizes the motor 106. More specifically, in the preferred embodiment, in which the motor 106 is implemented as a three-phase brushless DC motor, the actuator control circuit 104 appropriately energizes two of the three phases of the stator 116 to cause the rotor 114 to rotate in a direction that will in turn cause the translation member 124 to move to a desired position. Thus, as FIG. 1 additionally depicts, the actuator control circuit 104 preferably includes at least an inverter 126 and an appropriate motor controller 128.

The motor controller 128, using any one of numerous motor commutation control schemes, implements proper motor 106 commutation based on motor rotational position signals received from the commutation sensor 112. The commutation sensor 112 may be implemented using any one of numerous types of devices, now known or developed in the future, for sensing motor rotational position and supplying a signal representative thereof. For example, the commutation sensor 112 could be implemented as a Hall-type sensor or a resolver, just to name a few. No matter the specific type of sensor that is used to implement the commutation sensor 112, as FIG. 1 additionally depicts, it additionally supplies the rotational position signal to a position determination circuit. One particular embodiment of the position determination circuit 130 is depicted in FIG. 2, and with reference thereto will now be described.

Figure 2:
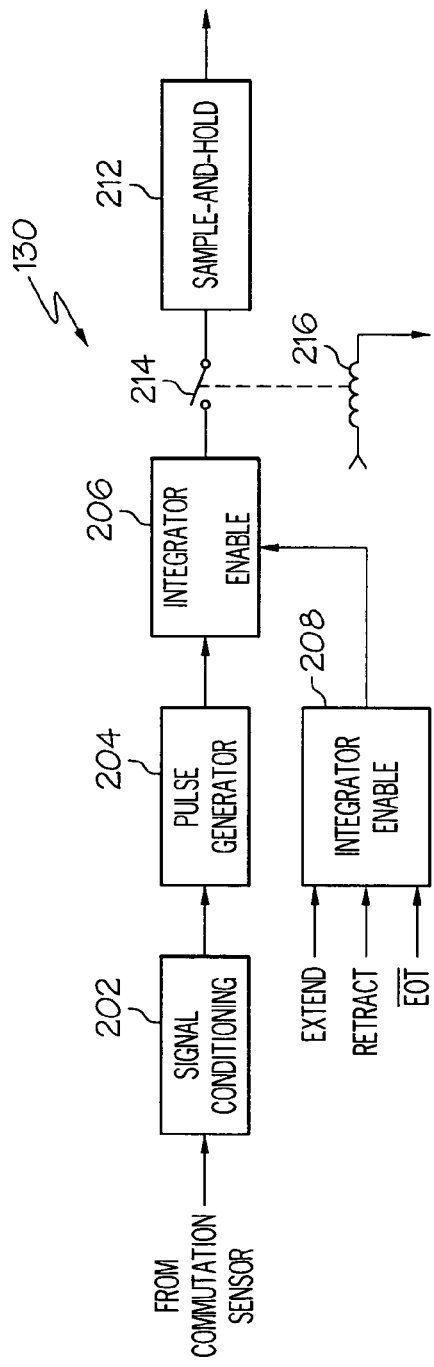
FIG. 2 is a functional block diagram of an exemplary position determination circuit that may be used to implement the system of FIG. 1.

The position determination circuit 130 depicted in FIG. 2 includes a signal conditioning circuit 202, a pulse generator 204, an integrator circuit 206, an integrator enable circuit 208, and a sample-and-hold circuit 212. The signal conditioning circuit 202 receives the rotational position signal from the commutation sensor 112 and supplies an appropriately conditioned signal to the pulse generator 204. It will be appreciated that the signal conditioning circuit 202 may also be configured to provide appropriate impedance matching between the commutation sensor 112 and the pulse generator 204, and may be implemented using any one of numerous signal conditioning circuit configurations. It will additionally be appreciated that the position determination circuit 130 could, at least in some embodiments, be implemented without the signal conditioning circuit 202.

The pulse generator 204 is coupled to receive the rotational position signal from the commutation sensor 112, either directly or via the signal conditioning circuit 202. The pulse generator 204, which is preferably implemented as a precision one-shot circuit, is configured to generate a pulse each time the rotational position signal represents a complete revolution of the motor 106. It will thus be appreciated that the frequency at which the pulse generator 204 supplies a pulse will vary with the rotational speed of the motor 106. In particular, the pulse repetition frequency of the pulse generator 204 will increase as motor rotational speed increases, and vice-versa. No matter the specific frequency at which the pulse generator 204 is supplying pulses, each pulse is supplied to the integrator circuit 206.

The integrator circuit 206 is coupled to receive the pulses supplied from the pulse generator 204 and is configured, upon receipt of each pulse, to selectively supply a position signal having a voltage magnitude that is representative of actuator position. More specifically, the integrator circuit 206, in addition to receiving each pulse generated by the pulse generator 204, is coupled to receive both an enable signal and a direction and slope signal (DIR/SLOPE). In the depicted embodiment both of these signals are supplied from the integrator enable circuit 208. It will be appreciated, however, that one or both of these signals could be supplied from other external sources. Nonetheless, the integrator circuit 206 is configured such that it is enabled only when it is supplied with the enable signal. The integrator circuit 206, when enabled, integrates the received pulses with respect to time, and thereby supplies a position signal having a voltage magnitude representative of the number and direction of motor revolutions, which is in turn representative of the actuator and/or component position.

The integrator enable circuit 208, as mentioned above, is configured to selectively supply an enable signal and, at least in the depicted embodiment a direction and slope signal to the integrator circuit 206. In particular, the integrator enable circuit 208 supplies the enable signal and the direction and slope signal when an actuator position command is being supplied to the actuator control circuit 104, and when the actuator assembly 102 (or actuated component 125) is not in an end-of-travel position. The supplied actuator position command may be one that causes the motor 106 to rotate in either a first direction or a second direction, to thereby cause the actuator assembly 102 to move in either a first direction or a second direction. For example, in the embodiment depicted in FIG. 2, the actuator position command may be either an EXTEND command or a RETRACT command. It will be appreciated, however, that the specific command type may vary depending on the particular component that is being actuated. For example, the command type could be OPEN and CLOSED commands. No matter the specific command type, the direction and slope signal informs the integrator circuit 206 which direction the motor 106 is rotating, and thus the relative direction/slope the position signal supplied from the integrator circuit 206 should follow.

As was noted above, the integrator enable circuit 208 supplies the integrator enable circuit when, in addition to there being an actuator position command being supplied, the actuator assembly 102 (or actuated component 125) is not in an end-of-travel position (e.g. EOT). For example, if the actuated component 125 is one that moves between an extended and a retracted position, then the end-of-travel positions will be the extended and retracted positions. Although any one of numerous devices and/or methods may be used to determine when the actuator assembly 102 and/or actuated component 125 is in an end-of-travel position, in the depicted embodiment, and with reference once again to FIG. 1, these positions are determined via end-of-travel switches 132, 134.

Returning once again to FIG. 2, it is seen that the position signal output from the integrator circuit 206 is supplied to the sample-and-hold circuit 212, via a switch 214. The sample-and-hold circuit 212, as is generally known, is configured to selectively supply the position signal and to store the voltage magnitude representative of the position of the component. In particular, whenever the switch 214 is closed, and the position signal is being supplied, the sample-and-hold circuit 212 stores at least the most recent voltage magnitude and supplies the position signal to, for example, a position indicator and/or as a feedback signal. However, when the switch 214 is open, the sample-and-hold circuit 212 stores the most recent voltage magnitude.

The switch 214, which in the depicted embodiment is a solenoid-operated switch, is configured to be in the closed position when the position determination circuit 130 is energized, and in the open position when the position determination circuit 130 is deenergized. Thus as FIG. 2 depicts, the switch 214 is moved to the closed position when its associated solenoid 216 is energized, and is moved to the open position when the solenoid 216 is deenergized. With this configuration, in the unlikely event that electrical power is lost to, or otherwise removed from, the position determination circuit 130 and then subsequently restored, the position determination circuit 130 will be able to implement control based on the last known position, which is stored in the sample-and-hold circuit 212.

The position determination circuit 130 depicted in FIG. 2 and described above is merely exemplary of one particular embodiment that may be used to implement the described functionality using a wholly analog circuit configuration. It will be appreciated that various other analog circuit configurations may additionally be used. It will additionally be appreciated that the position determination circuit 130 could be implemented using any one of numerous digital circuit configurations. One particular digital circuit configuration is depicted in FIG. 3, and with reference thereto will now be described.

Figure 3:
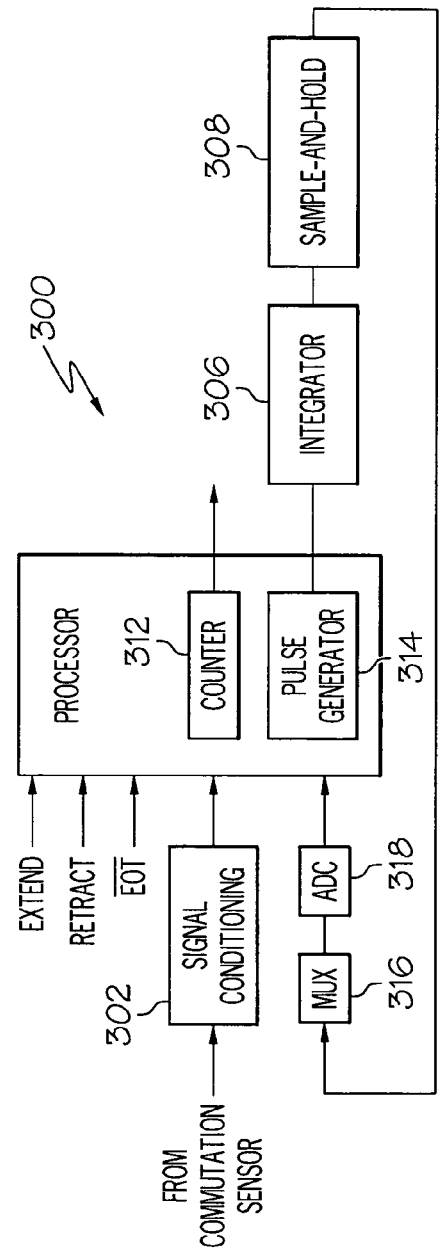
FIG. 3 is a functional block diagram of an exemplary alternative position determination circuit that may be used to implement the system of FIG. 1.

The position determination circuit 300 depicted in FIG. 3 includes a signal conditioning circuit 302, a processor 304, an integrator circuit 306, and a sample-and-hold circuit 308. The signal conditioning circuit 302, as in the previously-described embodiment, receives the rotational position signal from the commutation sensor 112 and supplies an appropriately conditioned signal. However, the conditioned signal is supplied to the processor 304 rather than to the pulse generator 204. It will be appreciated that the signal conditioning circuit 302 may also be configured to provide appropriate impedance matching between the commutation sensor 112 and the processor 304, and may additionally implement appropriate analog-to-digital conversion, if this functionality is not implemented by the processor 304. It will additionally be appreciated, as in the previous embodiment, that the position determination circuit 302 may be implemented using any one of numerous signal conditioning circuit configurations, and could, at least in some embodiments, be implemented without the signal conditioning circuit 302.

The processor 304, which may be implemented using any one of numerous general-purpose processors, an application specific processor, or a digital signal processor (DSP), just to name a few, is preferably configured to implement various functions. For example, in the depicted embodiment the processor 304 is configured to implement at least a counter 312, and a pulse generator 314. It will be appreciated that the processor 304 may additionally be configured to implement various other functions including, for example, the inverter 126 and/or motor controller 128 functionality. No matter the specific number of additional functions it implements, the processor 304 receives the rotational position signal from the commutation sensor 112, either directly or via the signal conditioning circuit 302. The processor 304, in response to the rotational position signal, commands the counter 312 to count the number of complete revolutions of the motor 106, and determines the position of the actuator assembly 102 and/or actuated component 125 based on the number of complete revolutions counted.

In addition to commanding the counter 312 to count complete motor revolutions, the processor 304 commands the pulse generator 314 to generate a pulse each time the motor 106 makes a complete revolution. Thus, as with the previously described embodiment, the frequency at which the pulse generator 314 supplies a pulse will vary with the rotational speed of the motor 106, and each pulse is supplied to the integrator circuit 306. The integrator circuit 306 and sample-and-hold circuit 308 function at least substantially identically to the integrator circuit 206 and sample-and-hold circuit 208 described above. As such, the functions of these circuits 306, 308 will not be repeated. One difference, however, is that the integrator circuit 306 in the instant embodiment does not receive an integrator enable signal. The reason for this is because the processor 304 is configured to receive the actuator position commands (e.g., EXTEND and RETRACT commands), and the signal indicating that the actuator assembly 102 and/or actuated component 125 is not in an end-of-travel position (e.g., (e.g. EOT). Thus, a separate integrator enable circuit 208 is not needed. It will be appreciated, however, that the position determination circuit 300 could be implemented with the integrator enable circuit 208, if so desired.

In addition to each of the above-described circuits, the position determination circuit 300 depicted in FIG. 3 includes a multiplexer 316 and an analog-to-digital converter (ADC). These circuits 316, 318 are provided so that the analog position signal output from the integrator circuit 306 can be fed back to the processor 304, thereby providing redundancy to the digital position determination functionality implemented via the counter 312. Moreover, as before, the sample-and-hold circuit 308 stores the voltage magnitude representative of the position of the component, and can be used to re-establish position control if power is lost to the position determination circuit 300. It will be appreciated that although the multiplexer 316 and ADC 318 are depicted as being implemented separate from the processor 304, one or both could be implemented in the processor 304.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A position determination circuit for determining a position of a component driven by a brushless DC motor, the circuit comprising:
   a commutation sensor configured to sense a rotational position of the brushless DC motor and operable to supply a rotational position signal representative thereof;
   a pulse generator coupled to receive the rotational position signal and operable to generate a pulse each time the rotational position signal represents a complete revolution of the brushless DC motor; and
   an integrator circuit coupled to receive (i) an enable signal and (ii) each pulse generated by the pulse generator, the integrator circuit operable, upon receipt of both the enable signal and each pulse, to selectively supply a position signal having a voltage magnitude representative of the position of the component.

2. The circuit of claim 1, wherein the component is driven between at least a first end-of-travel position and a second end-of-travel position, and wherein the circuit further comprises:
   an integrator enable circuit coupled to receive (i) one or more command signals representative of a command to move the component to the first or second position and (ii) an end-of-travel signal indicating that the component is not in either the first or second end-of-travel positions, the integrator enable circuit coupled to the integrator and configured to supply the enable signal thereto, upon receipt of the one or more command signals and the end-of-travel signal.

3. The circuit of claim 1, further comprising:
   a sample-and-hold circuit coupled to receive the position signal from the integrator and configured, upon receipt thereof, to (i) selectively supply the position signal and (ii) selectively store the voltage magnitude representative of the position of the component.

4. The circuit of claim 3, wherein the sample-and-hold circuit stores the voltage magnitude when the position signal is not being supplied thereto.

5. The circuit of claim 3, further comprising:
   a switch electrically coupled between the integrator and the sample-and-hold circuit, the switch movable between a closed position, in which the integrator is electrically coupled to the sample-and-hold circuit, and an open position, in which the integrator is electrically isolated from the sample-and-hold circuit.

6. The circuit of claim 5, wherein the switch is in the closed position when the circuit is energized, and in the open position when the circuit is deenergized.

7. The circuit of claim 6, wherein:
   the switch is a solenoid operated switch;
   the switch is moved to the closed position when the solenoid is energized; and
   the switch is moved to the open position when the solenoid is deenergized.

8. The circuit of claim 1, further comprising:
   signal conditioning circuitry electrically coupled between the commutation sensor and the pulse generator.

9. An actuation control system, comprising:
   a motor control circuit configured to receive position command signals and operable, upon receipt thereof, to supply DC excitation signals;
   a brushless DC motor coupled to receive the DC excitation signals and operable, upon receipt thereof, to rotate and supply a drive force;
   an actuator coupled to receive the drive force and operable, upon receipt thereof, to move to an actuator position;
   a commutation sensor configured to sense rotational position of the brushless DC motor and operable to supply a rotational position signal representative thereof;
   a pulse generator coupled to receive the rotational position signal and operable to generate a pulse each time the rotational position signal represents a complete revolution of the brushless DC motor; and
   an integrator circuit coupled to receive (i) an enable signal and (ii) each pulse generated by the pulse generator, the integrator circuit operable, upon receipt of both the enable signal and each pulse, to selectively supply a position signal having a voltage magnitude representative of the actuator position.

10. The system of claim 9, wherein the actuator is driven between at least a first end-of-travel position and a second end-of-travel position, and wherein the system further comprises:
    an integrator enable circuit coupled to receive (i) one or more signals at least indicating that position command signals are being supplied to the motor control circuit and (ii) an end-of-travel signal indicating that the component is not in either the first or second end-of-travel positions, the integrator enable circuit coupled to the integrator and configured to supply the enable signal thereto, upon receipt of the one or more command signals and the end-of-travel signal.

11. The system of claim 10, further comprising:
    a first end-of-travel switch movable between a first position and a second position, the first end-of-travel switch configured to be in the first position when the actuator is in the first end-of-travel position, and in the second position when the actuator is not in the first end-of-travel position; and
    a second end-of-travel switch movable between a first position and a second position, the second end-of-travel switch configured to be in the first position when the actuator is in the second end-of-travel position, and in the second position when the actuator is not in the second end-of-travel position,
    wherein the end-of-travel signal is supplied to the integrator enable circuit when the first and second end-of-travel switches are both in the second position.

12. The system of claim 9, further comprising:
    a sample-and-hold circuit coupled to receive the position signal from the integrator and configured, upon receipt thereof, to (i) selectively supply the position signal and (ii) selectively store the voltage magnitude representative of the position of the component.

13. The system of claim 12, wherein the sample-and-hold circuit stores the voltage magnitude when the position signal is not being supplied thereto.

14. The system of claim 12, further comprising:
    a switch electrically coupled between the integrator and the sample-and-hold circuit, the switch movable between a closed position, in which the integrator is electrically coupled to the sample-and-hold circuit, and an open position, in which the integrator is electrically isolated from the sample-and-hold circuit.

15. The system of claim 14, wherein the switch is in the closed position when the circuit is energized, and in the open position when the circuit is deenergized.

16. The system of claim 15, wherein:

the switch is a solenoid operated switch;

the switch is moved to the closed position when the solenoid is energized; and the switch is moved to the open position when the solenoid is deenergized.

17. A position determination circuit for determining a position of a component driven by a brushless DC motor, the circuit comprising:

a commutation sensor configured to sense a rotational position of the brushless DC motor and operable to supply a rotational position signal representative thereof;

a processor including a counter and a pulse generator, the processor coupled to receive the rotational position signal and operable, upon receipt thereof, to (i) command the counter to count a number of complete revolutions of the brushless DC motor and (ii) command the pulse generator to generate a pulse each time the brushless DC motor makes a complete revolution; and an integrator circuit coupled to receive each pulse generated by the pulse generator and operable, upon receipt thereof, to supply an analog position signal having a voltage magnitude representative of the position of the component.

18. The circuit of claim 17, wherein the processor is further operable to determine the position of the component based at least in part on the number of complete revolutions counted by the counter.

19. The circuit of claims 17, further comprising:

an analog-to-digital converter coupled to receive the analog position signal and operable, upon receipt thereof, to convert the analog position signal to a digital position signal representative of the position of the component, wherein the processor is further coupled to receive the digital position signal from the ADC and is further operable to determine the position of the component based on the digital position signal.

20. The system of claim 17, further comprising:

a sample-and-hold circuit coupled to receive the analog position signal from the integrator and configured, upon receipt thereof, to (i) selectively supply the analog position signal and (ii) selectively store the voltage magnitude representative of the position of the component.

* * * * *